United States Patent [19]

Maholland et al.

[11] Patent Number: 5,188,995
[45] Date of Patent: Feb. 23, 1993

[54] REACTIVATION AND PASSIVATION OF SPENT CRACKING CATALYSTS

[75] Inventors: Michael K. Maholland; Chia-Min Fu, both of Bartlesville, Okla.; Richard E. Lowery, Muscatine, Iowa

[73] Assignee: Phillips Petroleum Company, Bartlesville, Okla.

[21] Appl. No.: 856,432

[22] Filed: Mar. 24, 1992

[51] Int. Cl.$^5$ .................. B01J 29/38; B01J 38/62; C10G 11/05

[52] U.S. Cl. ................. 502/28; 208/52 CT; 208/120; 502/516; 502/521

[58] Field of Search .............. 502/28, 22, 516, 521; 208/52 CT

[56] References Cited

U.S. PATENT DOCUMENTS

| | | | |
|---|---|---|---|
| 2,380,731 | 7/1945 | Drake et al. | 502/28 |
| 3,711,422 | 1/1973 | Johnson et al. | 252/414 |
| 4,234,452 | 11/1980 | Burk, Jr. et al. | 252/419 |
| 4,280,897 | 7/1981 | Shah et al. | 208/113 |
| 4,595,666 | 6/1986 | Ganguli | 502/26 |
| 4,824,814 | 4/1989 | Elvin et al. | 502/22 |
| 4,830,997 | 5/1989 | Trinh et al. | 502/28 |
| 4,935,121 | 6/1990 | Fu et al. | 208/120 |
| 5,021,377 | 6/1991 | Maholland et al. | 502/26 |
| 5,141,904 | 8/1992 | Kubicek et al. | 502/28 |

FOREIGN PATENT DOCUMENTS 254530  3/1988  Fed. Rep. of Germany ........ 502/28

*Primary Examiner*—Paul E. Konopka
*Attorney, Agent, or Firm*—K. K. Brandes

[57] ABSTRACT

A spent metal-contaminated zeolite-containing catalytic cracking catalyst is reactivated by a process which comprises contacting the spent catalyst with at least one dissolved carboxylic acid and at least one antimony compound.

19 Claims, No Drawings

REACTIVATION AND PASSIVATION OF SPENT CRACKING CATALYSTS

BACKGROUND OF THE INVENTION

This invention relates to a method of reactivating spent, metal-contaminated zeolite-containing catalytic cracking catalysts. In another aspect, this invention relates to a catalytic cracking process employing a reactivated spent catalytic cracking catalyst.

Various methods of rejuvenating deactivated, metal-contaminated zeolite-containing catalytic cracking catalysts are known, such as treatment with ammonium compounds and fluorine compounds, described in U.S. Pat. Nos. 5,021,377, 4,954,244 and 4,935,121. However, there is an ever present need to develop new, effective catalyst reactivation processes.

SUMMARY OF THE INVENTION

It is an object of this invention to provide a process for treating a spent, metal-contaminated zeolite-containing catalytic cracking catalyst composition under such conditions as to enhance its catalytic cracking activity and to alleviate its tendency of generating hydrogen during catalytic cracking. It is another object of this invention to provide a reactivated zeolite-containing catalytic cracking catalyst composition. It is another object of this invention to employ a reactivated spent catalytic cracking catalyst composition in a catalytic cracking process. Other objects and advantages will become apparent from the detailed description of the invention and the appended claims.

According to this invention, a process for reactivating a spent cracking catalyst composition comprises the steps of:

(a) contacting a spent zeolite-containing catalytic cracking catalyst composition which contains at least one metal contaminant substantially simultaneously with (i) at least one dissolved carboxylic acid and (ii) at least one antimony compound, essentially at nonoxidizing conditions;

(b) contacting the treated spent catalytic cracking catalyst composition obtained in step (a) at least once with an aqueous wash liquid and substantially separating the thus-washed catalyst composition from the aqueous wash liquid (preferably water), essentially at nonoxidizing conditions; and (c) heating the at least partially separated, washed catalytic cracking catalyst composition obtained in step (b) at such conditions as to substantially remove water from said at least partially separated, washed catalytic cracking catalyst composition;

wherein said catalyst reactivation process is carried out at such conditions as to obtain a reactivated catalytic cracking catalyst composition exhibiting higher catalytic cracking activity (as evidenced by enhanced feed conversion and higher gasoline yield) and lower hydrogen generation, when employed in a process for catalytically cracking a hydrocarbon-containing oil, than said spent zeolite-containing catalytic cracking catalyst composition.

Preferred carboxylic acids are saturated aliphatic or cycloaliphatic or aromatic carboxylic acids containing 1–4 (more preferably 1–2) carboxyl (—COOH) groups and a total number of 1–10 (more preferably 1–3) carbon atoms per molecule. Also preferred are hydroxy-substituted carboxylic acids containing 1–4 (more preferably 1–3) carboxyl groups, a total number of 2–12 (more preferably 3–6) carbon atoms per molecule, and 1–2 hydroxyl (—OH) groups attached to at least one hydrocarbyl (i.e., aliphatic or cycloaliphatic or aromatic) group. Presently more preferred are saturated aliphatic monocarboxylic acids and saturated aliphatic monohydroxy-substituted carboxylic acids.

In a preferred embodiment, step (a) of the reactivation process of this invention is carried out with an aqueous mixture comprising (preferably consisting essentially of) component (i), component (ii) and (iii) water. In another preferred embodiment, the aqueous wash liquid used in step (b) consists essentially of water.

Also in accordance with this invention, a reactivated spent cracking catalyst composition is provided which has been reactivated by the above-described process. The reactivated spent cracking catalyst composition can be re-employed in the catalytic cracking of a hydrocarbon-containing oil.

Detailed Description of the Invention

The term "catalytic cracking", as used herein, implies that essentially no hydrocracking occurs and that the catalytic cracking process is carried out with a hydrocarbon-containing oil substantially in the absence of added hydrogen gas. Hydrogen generation is measured in a test for catalytically cracking a heavy hydrocarbon-containing oil, being carried out substantially in accordance with the procedure of Example II of U.S. Pat. No. 4,794,095. The term "spent", as used herein, implies that at least a portion of the zeolite-containing catalyst composition employed in the reactivation process of this invention has previously been used in a process for catalytically cracking hydrocarbon-containing oils, in particular those containing metal (Ni, V, Cu) impurities, and has thereby lost some of its catalytic activity (i.e., its catalytic cracking activity before its use in the previous cracking process). The spent catalytic cracking catalyst composition has been regenerated by stripping of adhered oil from the catalyst (such as by steam-stripping) and subsequent heating in an oxidizing gas atmosphere (such as air) so as to burn off coke deposits on the spent catalyst composition, before the reactivation process of this invention comprising steps (a)–(c) is carried out.

Any spent zeolite-containing catalyst composition, which contains at least one metal contaminant and at least a portion of which has previously been used in a catalytic cracking process, can be used as starting material in the acid treatment step of the reactivation process of this invention. The spent catalyst composition can contain any portion of such regenerated catalyst composition, ranging from 100% to about 10 weight-% (i.e., containing 0% to about 90 weight-% fresh, unused zeolite-containing catalytic cracking catalyst composition). The term "spent catalyst composition" encompasses equilibrium cracking catalysts, which are commonly employed in commercial catalytic cracking operations and generally comprise a physical blend of regenerated used catalyst composition and fresh (unused) cracking catalyst composition. An equilibrium catalyst generally comprises a mixture of catalyst particles of various ages, i.e., a portion of the equilibrium catalyst particles has passed through a varying number of cracking and regeneration cycles, while a small portion of the equilibrium catalyst particles is fresh (unused) cracking catalyst composition.

The zeolite component of the spent zeolite-containing catalytic cracking catalyst composition of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and the like, and mixtures thereof. Additional examples of suitable zeolites are listed in U.S. Pat. No. 4,158,621. The term "zeolite", as used herein, includes zeolites which have been pretreated, such as those from which a portion of Al has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromiasilicates, ferrosilicates, borosilicates, and the like, as disclosed in U.S. Pat. No. 4,556,749.

Generally, the zeolite component of the spent cracking catalyst composition is dispersed in a suitable solid refractory inorganic matrix material, such as alumina, silica, silica-alumina (presently preferred), aluminum phosphate, magnesium oxide, mixtures of two or more of the above-listed materials, and the like. The preparation of such zeolite/matrix cracking catalyst compositions is well known and is not a critical feature of this invention. Generally, the surface area (measured by nitrogen adsorption, substantially in accordance with the BET method of Brunauer, Emmett and Teller) of the spent zeolite/matrix cracking catalyst composition used in step (a) is in the range of from about 100 to about 800 $m^2/g$. Generally, the weight ratio of zeolite to matrix material in the spent cracking catalyst composition is in the range of from about 1:20 to about 1:1.

The spent zeolite-containing cracking catalyst composition employed in the reactivation process of the invention contains metal compounds as contaminants (generally as oxides), such as compounds (particularly oxides) of Ni, V, Fe, and Cu, and the like, in particular Ni and V. Contaminants of each metal can generally be present in amounts ranging from traces (about 0.01 weight-%) to about 2.0 weight-% of each contaminant metal, expressed as metal oxide. These impurities in the spent cracking catalyst compositions have generally been absorbed from the oil feed in a previous cracking process. However, the origin of these metal impurities is not believed to be a critical feature of this invention. It is within the scope of this invention to use spent cracking catalysts from which at least a portion of contaminant metals (Ni, V, Cu) have been removed (e.g., by the demetallizing process of U.S. Pat. No. 4,686,197).

Any suitable carboxylic acid and/or hydroxy-substituted carboxylic acid which is at least partially soluble in water can be employed as contacting agent (i) in step (a) of the catalyst reactivation process of the invention. Non-limiting examples of such acids are: formic acid, acetic acid, chloroacetic acid, di- and trichloroacetic acids, propionic acid, malonic acid, glutaric acid, succinic acid, adipic acid, pimelic acid, cyclohexanecarboxylic acid, benzoic acid, o-, m- and p-phthalic acids, hydroxyacetic acid, β-hydroxypropionic acid, lactic acid, citric acid, tartaric acid, salicylic acid, and mixtures thereof. Presently preferred are formic acid, acetic acid, citric acid (presently most preferred) and lactic acid.

Any suitable antimony compound can be employed as treating agent (ii) in step (a). Non-limiting examples of suitable Sb compounds are described in various patents (e.g. U.S. Pat. Nos. 3,711,422, 4,025,458, 4,190,552, 4,193,891 and 4,263,131). Preferred antimony components are antimony tris (0,0-dihydrocarbyl) phosphorodithioates, antimony oxides (more preferably $Sb_2O_5$), antimony carboxylates, antimony mercaptides, antimony fluoride and mixtures thereof.

The substantially simultaneous contacting of the spent, metal-contaminated zeolite-containing cracking catalyst with treating agents (i) and (ii) can be carried out in any suitable manner. In one mode of operation, the spent cracking catalyst is contacted (either by impregnation or by spraying or the like) with a liquid which contains both treating agents and water. Both agents are generally dissolved in water, but it is within the scope of this invention to employ Sb compounds which are colloidally dispersed in the aqueous liquid.

In another mode of operation, a first solution containing agent (i) and a second solution (or, alternatively, dispersion) containing agent (ii) are prepared. Then the spent catalyst composition is contacted with the first solution and immediately thereafter with the second solution (or colloidal dispersion) either by impregnation or by spraying. Or the spent catalyst is contacted with the second solution (or, alternatively, dispersion) and immediately thereafter with the first solution (either by impregnation or by spraying). Or the spent catalyst is simultaneously sprayed with the first solution and the second solution (or, alternatively, dispersion).

Any suitable concentration of at least one carboxylic acid in the acidic contacting solution can be employed. Preferably, the carboxylic acid concentration is about 0.001 to about 10 mol/l, more preferably about 0.5 to about 10 mol/l. The pH of the acidic contacting solution generally is below about 3, and preferably is about 0.5–2.

Any effective concentration of agent (ii) in the treating solution (or, alternatively, dispersion) can be applied, preferably about 0.01–0.5 mol/l Sb. Any suitable weight ratio of the at least one antimony compound to the spent cracking catalyst composition can be applied in step (a). Generally, this weight ratio is in the range of from about 0.00001:1 to about 0.05:1, preferably in the range of from about 0.001:1 to about 0.03:1.

Step (a) can be carried out as a batch process in a vessel, preferably with agitation (such as stirring or tumbling of the catalyst particles). Or it can be carried out continuously, such as by passing aqueous liquids comprising at least one of the above-described acids and of at least one antimony compound through a column filled with a spent cracking catalyst composition. Any suitable time of contact between the treating agents and the spent cracking catalyst composition can be employed, generally from about 0.05 to about 10 hours (preferably about 0.1–1 hour). Any suitable temperature can be employed in contacting step (a) generally from about 10° C. to about 100° C. (preferably about 60°–90° C.), generally at ambient pressure (1 atm). Generally, the weight-ratio of the aqueous contacting liquid which contain both agent (i) and agent (ii) to the spent cracking catalyst is in the range of from about 2:1 to about 100:1; preferably about 4:1 to about 20:1. Oxidizing agents (such as hydrogen peroxide and the like) are essentially absent in step (a).

In washing step (b), the treated spent catalyst composition obtained in step (a) is contacted with a wash liquid, preferably consisting essentially of water. The thus-washed catalyst composition is then substantially separated from the aqueous wash liquid. Any suitable separating means can be employed. Non-limiting examples of suitable solid/liquid separation means are filtration, centrifugation, settling and subsequent draining or decantation of the liquid, and the like. Generally, the temperature of the aqueous wash liquid is about 10° C.–100° C., preferably about 20° C.–95° C. This washing step enhances the catalytic cracking performance (as evidenced by higher oil feed conversion, higher gasoline yield and lower hydrogen generation) of the treated catalyst composition obtained in step (a). Preferred washing conditions include a weight ratio of the aqueous wash liquid in step (b) to the treated catalyst composition obtained in step (a) of about 0.5:1 to about 10:1, more preferably about 1:1 to about 4:1, and a time of contact between the wash liquid and the catalyst composition of about 1 minute to about 2 hours. The washing step (b) can be repeated at least once (i.e., once, twice or more than twice), before step (c) is carried out. Oxidizing agents (such as hydrogen peroxide and the like) are essentially absent in step (b).

The at least partially separated acid/Sb-treated catalyst composition obtained in step (b) is heated in step (c), so as to substantially remove adhered water therefrom. Preferably, this composition is heated at a temperature of about 80°–200° C. and at atmospheric pressure conditions for about 0.5–10 hours, so as to substantially dry this composition. Preferably, the drying step is followed by a calcining step (preferably at a temperature of about 450° to about 700° C., for about 0.2–10 hours, in air or an inert gas such as $N_2$). In the calcining step, remaining traces of water are removed from the composition and the applied antimony compound is substantially converted to an oxide (e.g., $Sb_2O_3$ and/or $Sb_2O_5$).

Any suitable effective total level of antimony in the acid-treated spent catalytic cracking catalyst composition can be attained. Generally, this level is in the range of from about 0.001 to about 5 weight-% Sb, based on the weight of the substantially dry material. Preferably, this level is about 0.01–3 weight-% Sb.

The reactivated cracking catalyst composition obtained in the above-described reactivation process of this invention can be used in any catalytic cracking process, i.e., a process for catalytically cracking hydrocarbon-containing oil feedstocks, in any suitable cracking reactor (e.g., in a FCC reactor or in a Thermofor moving bed reactor), essentially in the absence of added hydrogen gas. The reactivated catalyst composition obtained in the above-described steps can be used alone or in admixture with fresh (unused) zeolite-containing catalyst composition in catalytic cracking processes.

The hydrocarbon-containing feed stream for the catalytic cracking process of this invention can be any suitable feedstock. Generally the feed has an initial boiling point (ASTM D 1160) in excess of about 400° F., preferably a boiling range of from about 400° to about 1200° F., more preferably a range of from about 500° to about 1100° F., measured at atmospheric pressure conditions. The API gravity (measured at 60° F.) generally is in the range of from about 5 to about 40, preferably from about 10 to about 35. Generally, these feedstocks contain Ramsbottom carbon residue (ASTM D 524; usually about 0.1–20 weight-%), sulfur (generally about 0.1–5 weight-% S), nitrogen (generally about 0.05–2 weight-% N), nickel (generally about 0.05–30 ppm Ni, i.e., parts by weight of Ni per million parts by weight of feed), vanadium (generally about 0.1–50 ppm V) and copper (generally about 0.01–30 ppm Cu). Non-limiting examples of suitable feedstocks are light gas oils, heavy gas oils, vacuum gas oils, cracker recycle oils (cycle oils), residua (such as distillation bottoms fractions), and hydrotreated residua (e.g., hydrotreated in the presence of Ni, Co, Mo-promoted alumina catalysts), liquid coal pyrolyzates, liquid products from extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally, a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116. Generally, a catalyst regeneration unit (for removal of coke deposits) is combined with the FCC cracking unit, as is shown in the above-cited patents.

Specific operating conditions of the cracking operation depend greatly on the type of feed, the type and dimensions of the cracking reactor and the oil feed rate. Examples of operating conditions are described in the above-cited patents and in many other publications. In an FCC operation, generally the weight ratio of catalyst composition to oil feed (i.e., hydrocarbon-containing feed) ranges from about 2:1 to about 10:1, the contact time between oil feed and catalyst is in the range of from about 0.2 to about 2.0 seconds, and the cracking temperature is in the range of from about 800° to about 1200° F. Generally, steam is added with the oil feed to the FCC reactor so as to aid in the dispersion of the oil as droplets. Generally, the weight ratio of steam to oil feed is in the range of from about 0.05:1 to about 0.5:1.

The separation of the thus used cracking catalyst composition from gaseous and liquid cracked products and the separation of cracking products into various gaseous and liquid product fractions can be carried out by any conventional separation means. The most desirable product fraction is gasoline (ASTM boiling range: about 180°–400° F.). Non-limiting examples of such separation schemes are shown in "Petroleum Refining" by James H. Gary and Glenn E. Handwerk, Marcel Dekker, Inc., 1975.

Generally, the separated, used cracking catalysts are regenerated, preferably by steam stripping for removal of adhered oil and subsequent heating under oxidizing conditions so as to burn off carbon deposits. At least a portion of the regenerated cracking catalyst composition can then be treated by the reactivation process of this invention, and thereafter be recycled to the catalytic cracking reactor, generally in admixture with fresh (unused) cracking catalyst.

The following examples are presented to further illustrate this invention and are not to be considered as unduly limiting the scope of this invention.

EXAMPLE I

This example illustrates the reactivating treatment of a metal-contaminated equilibrium cracking catalyst composition with various liquid treating agents.

This zeolite-containing equilibrium catalytic cracking composition which was used as the starting material was a blend of fresh cracking catalyst and of spent cracking catalyst (having been used and regenerated in a FCC cracking operation at a refinery of Phillips Petroleum Company). This equilibrium catalyst composition (labeled "J-8802") contained about 10 weight-% zeolite, which was embedded in a silica-alumina matrix, 0.18 weight-% Ni, 0.32 weight-% V, 0.53 weight-% Fe, 0.01 weight-% Cu, 0.06 weight-% Sb, and 0.34 weight-% Na. "J-8802" had a surface area of about 110 m²/g, a total pore volume of 0.18 cc/g, an apparent bulk density of 0.90 g/cc, and a zeolite unit cell size of 24.36 Å.

Catalyst A was prepared by spraying, by means of a syringe, a solution containing 10 grams of citric acid, 0.5 grams of Phil-Ad CA 6000 (an aqueous dispersion of $Sb_2O_5$ containing 20 weight-% Sb; marketed by Catalyst Resources, Inc., Pasadena, TX), and 45 grams of distilled water onto 100 grams of equilibrium catalyst J8802, while rotating the catalyst sample (contained in a beaker) on an inclined table. Drying of the treated catalyst was carried out at 300° F. for about 2 hours in air. The dried catalyst was then calcined for about 1 hour in air at 1000° F. Calcined Catalyst A contained about 0.16 weight-% Sb.

Catalyst B1 was prepared as described for Catalyst A, except that 400 grams of distilled water were poured onto wet Catalyst A (which had not been dried and calcined) and rotating the mixture of wet Catalyst A and water for 5 minutes on an inclined plane. The entire mixture was then filtered and the filter cake was washed again with water and separated from the wash liquid (as described above). The wet, twice-washed filter cake was then dried in air for about 2 hours at 300° F. and calcined in air for 1 hour at 1000° F. Calcined Catalyst B1 contained about 0.16 weight-% Sb.

Catalyst B2 was prepared essentially in accordance with the procedure for Catalyst B1. Thus, Catalyst B2 was essentially a duplicate of Catalyst B2.

EXAMPLE II

This example illustrates the performance of the reactivated spent cracking catalysts described in Example I in a catalytic cracking test reactor.

The test reactor was a MCBU (microconfined bed unit) cracking test reactor, substantially in accordance with the procedure of Example II of U.S. Pat. No.4,794,095. Cracking test conditions comprised a temperature of about 950° F., a catalyst:oil weight ratio of 6:1, and the use of a hydrotreated residuum as oil feed having API gravity (at 60° F.) of 18.7, sulfur content of 0.53 weight-%, basic nitrogen content of 0.09 weight-%, Conradson carbon content of 6.7 weight-%, nickel content of 10.6 ppm and vanadium content of 12.7 ppm. Average test results of at least two duplicate runs for each catalyst are summarized in Table I.

TABLE I

| Catalyst | Average Conversion (Wt % of Feed) | Average Gasoline Yield[1] | Average Hydrogen Generation[2] |
|---|---|---|---|
| J-8802 (Base Catalyst) | 76.2 | 50.0 | 398 |
| A | 76.2 | 50.3 | 313 |
| B1 | 79.7 | 53.2 | 198 |
| B2 | 78.7 | 52.9 | 214 |

[1] weight-% of converted feed
[2] standard cubic feet $H_2$ per barrel of converted feed.

Test data in Table I demonstrate that water-washing of a metal-contaminated cracking catalyst which had been contacted with a carboxylic acid and an antimony compound significantly enhanced feed conversion and gasoline yield and substantially lowered hydrogen generation (Catalysts B1 and B2 vs. Catalyst A).

Reasonable variations, modifications and adaptations for various conditions and uses can be made within the scope of the disclosure and appended claims.

What is claimed is:

1. A process for reactivating a spent cracking catalyst composition which comprises the steps of:
   (a) contacting a spent zeolite-containing catalytic cracking catalyst composition which contains at least one metal contaminant substantially simultaneously with at least one aqueous solution comprising about 0.001-10 mol/l of at least one carboxylic acid and at least one antimony compound, essentially at nonoxidizing conditions;
   (b) contacting the treated spent catalytic cracking catalyst composition obtained in step (a) at least once with an aqueous wash liquid consisting essentially of water, at a weight ratio of water to said treated spent catalytic cracking catalyst composition obtained in step (a) in the range of about 0.5:1 to about 10:1 for a time period in the range of about 1 minute to about 2 hours, and substantially separating the thus-washed catalyst composition from the aqueous wash liquid, essentially at nonoxidizing conditions; and
   (c) heating the at least partially separated, washed catalytic cracking catalyst composition obtained in step (b) at such conditions as to substantially remove water from said at least partially separated, washed catalytic cracking catalyst composition;
   wherein said catalyst reactivation process is carried out at such conditions as to incorporate about 0.001-5 weight-% antimony into said spent catalytic cracking catalyst composition, and to obtain a reactivated catalytic cracking catalyst composition exhibiting higher catalytic cracking activity and lower hydrogen generation, when employed in a process for catalytically cracking a hydrocarbon-containing oil, than said spent zeolite-containing catalytic cracking catalyst composition.

2. A process in accordance with claim 1, wherein said at least one metal contaminant is selected from the group consisting of compounds of nickel, vanadium, iron and copper.

3. A process in accordance with claim 1, wherein said at least one aqueous solution consists essentially of said at least one carboxylic acid, said at least one antimony compound and water.

4. A process in accordance with claim 3, wherein said at least one carboxylic acid is selected from the group consisting of formic acid, acetic acid, citric acid and lactic acid.

5. A process in accordance with claim 3, wherein said at least one carboxylic acid is citric acid.

6. A process in accordance with claim 3, wherein the pH of said aqueous solution is about 0.5-2.

7. A process in accordance with claim 3, wherein said aqueous solution contains about 0.5-10 mol/l of said at least one carboxylic acid and about 0.01-0.5 mol/l antimony.

8. A process in accordance with claim 7, wherein said at least one carboxylic acid is citric acid.

9. A process in accordance with claim 3, wherein said contacting of said aqueous solution with said spent catalytic cracking catalyst composition is carried out at a weight ratio of said aqueous solution to said spent catalytic cracking catalyst composition of about 2:1 to about 100:1.

10. A process in accordance with claim 3, wherein the weight ratio of said aqueous solution to said spent catalytic cracking catalyst composition and the antimony concentration in said aqueous solution are such as to incorporate about 0.01-3 weight-% Sb into said spent catalytic cracking catalyst composition.

11. A process in accordance with claim 1, wherein said aqueous wash liquid used in step (b) consists essentially of water.

12. A process in accordance with claim 11, wherein the temperature of said aqueous wash liquid used in step (b) is in the range of about 10° C. to about 100° C.

13. A process in accordance with claim 1, wherein step (b) is repeated at least once.

14. A process in accordance with claim 1, wherein step (c) is carried out in two sub-steps: first at about 80°-200° C. for about 0.5-10 hours and then at about 450°-700° C. for about 0.2-10 hours.

15. A process in accordance with claim 1, wherein said spent zeolite-containing catalytic cracking catalyst composition contains about 0.01-2.0 weight-% nickel and about 0.01-2.0 weight-% vanadium.

16. A process in accordance with claim 1, wherein the weight ratio of said at least one antimony compound to said spent zeolite-containing catalytic cracking composition in step (a) is in the range of about 0.001:1 to about 0.03:1.

17. A process in accordance with claim 1, wherein step (a) is carried out at a temperature of about 10°-100° C. for a period of time of about 0.05-10 hours.

18. A process in accordance with claim 1, wherein step (a) is carried out with a first aqueous solution containing said at least one carboxylic acid and a second aqueous solution or, alternatively, dispersion of said at least one antimony compound.

19. A process in accordance with claim 1, wherein said at least one antimony compound is selected from the group consisting of antimony tris(0,0-dihydrocarbyl) phosphorodithioates, antimony oxides, antimony carboxylates, antimony mercaptides and antimony fluorides.

* * * * *